Figure 1:
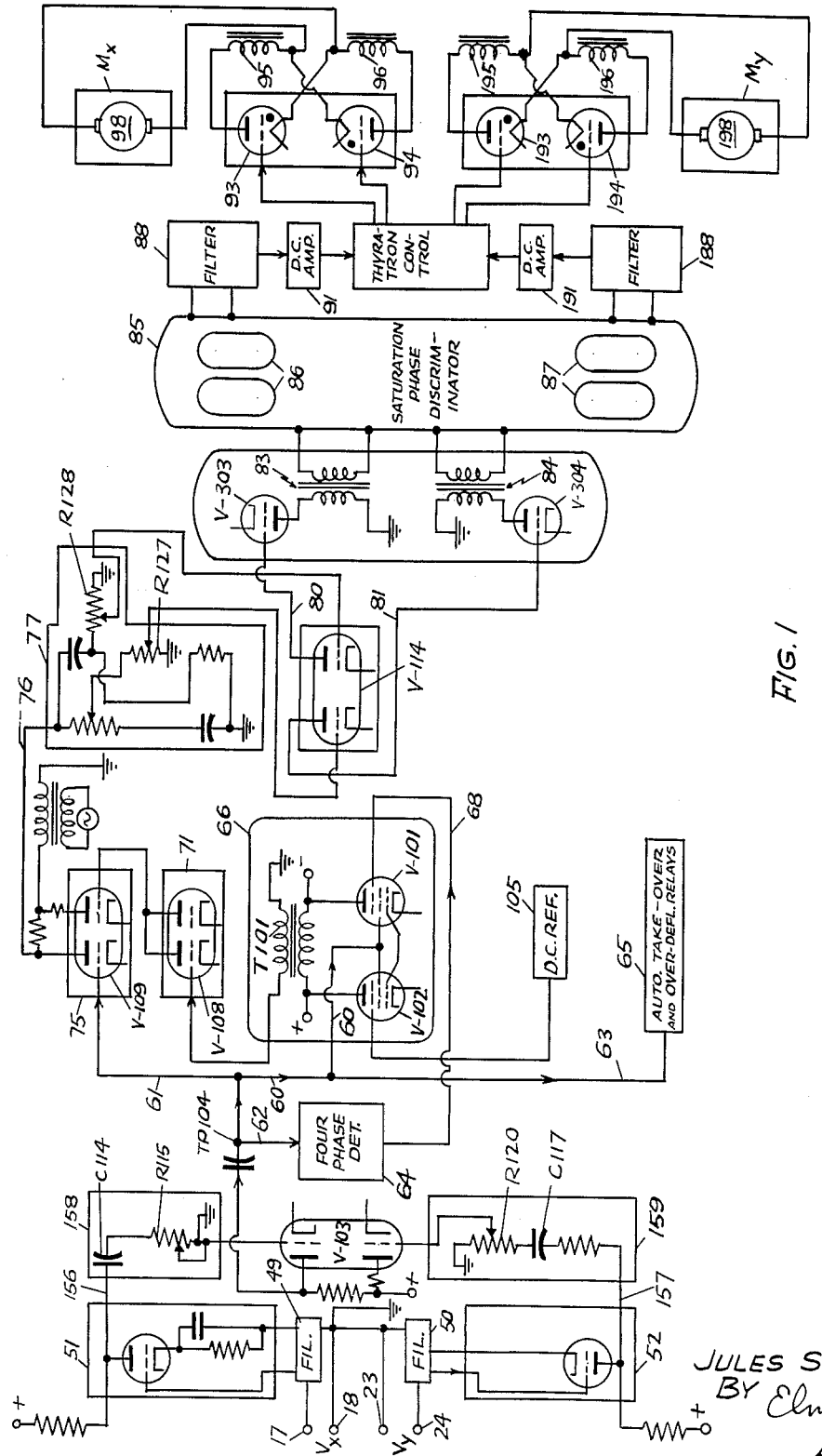

May 15, 1956 J. SANDOCK 2,745,972
ELECTRONIC POSITION AND MOTION CONTROL SYSTEMS
Filed Dec. 9, 1953 2 Sheets-Sheet 1

INVENTOR
JULES SANDOCK
BY Elmer J. Gorn
ATTORNEY

INVENTOR
JULES SANDOCK
BY Elmer J. Gorn
ATTORNEY

United States Patent Office 2,745,972
Patented May 15, 1956

2,745,972
ELECTRONIC POSITION AND MOTION CONTROL SYSTEMS

Jules Sandock, Hyattsville, Md., assignor to Raytheon Manufacturing Company, Waltham, Mass., a corporation of Delaware Application December 9, 1953, Serial No. 397,227

5 Claims. (Cl. 307—149)

This invention relates to electronic systems for supervising and controlling the position and motion of a movable element, and more particularly to an accurate and precise control based upon and utilizing as the control forces a pair of voltages representing vectorial components of a stressing force set up by the element to be controlled.

Patent No. 2,627,055, granted January 27, 1953, discloses a vector voltage responsive system and illustrates the mode of operation of such a system as applied to the task of duplicating with a machine tool the contour of a template conforming to the specifications to be incorporated into a piece of material subjected to treatment by such machine tool.

As explained in said patent, a pair of orthogonally related vector voltages controls the operation of a pair of stylus positioning motors functioning concurrently to impart to the template-engaging stylus (and/or to the cutting tool) a movement which is a vectorial resultant of the two complementary driving forces applied by the respective motors.

So long as the stressing force on the stylus is constant, the normal resultant voltage may be transmitted without change to the point of separation into its two motor-operating components, but, as the stylus deviates from its normal deflection, the system operates to detect such deviations, and to apply to the normal voltage a correction voltage representing the stress increment or decrement, that is, its degree of departure from a fixed reference D. C. voltage constituting the predetermined operating value for tangential stylus travel. In the Calosi patent this voltage correction involves inserting a rectification stage immediately following the first stage of voltage vector summation. As shown in the patent, a rectifier receives the summarized or consolidated single phase alternating voltage and converts it to D. C. voltage that is utilized in a pair of modulator circuits for comparison with the fixed reference D. C. voltage above referred to, and the resultant change in modulator output operates to produce the correction signal. Thus the rectification stage follows immediately after the voltage vector summation stage.

In the present invention, on the other hand, the first stage of voltage vector summation is followed, first, by a phase displacing stage and, second, by a voltage dividing stage, so that four voltages in phase quadrature are supplied to the rectifier stage for rectification to D. C. correction signal voltage. In other words, in lieu of the single-step conversion from single frequency, high amplitude voltage to D. C. voltage, as in the cited patent, the present invention substitutes three-step conversion; the first step of conversion consisting of displacing the phase of one component of the previously consolidated voltage, thus establishing double frequency, lower amplitude signal energy; the second step of conversion consisting of dividing the two phase-displaced components into four parallel phase-displaced alternating voltages; and the third step of conversion consisting of individually rectifying each of said four phase-displaced alternating voltages.

As a result of this three-step conversion from voltage vector summation, with the final step utilizing four-phase detection, the following important advantages are gained:

(1) The amplitude of the alternating ripple voltage carried with the D. C. output of the detector is radically reduced; and (2) The ripple frequency is doubled in each of the four parallel detection circuits, thereby greatly simplifying the task of filtering out the unwanted ripple components, and reducing the time delay in correction signal transmission.

Other features and characteristics of the invention will be revealed by reference to the following detailed description of one embodiment of the invention, the said embodiment being described, and illustrated in the accompanying drawings, in connection with its application to a contour duplicating system basically similar to that of the cited Calosi patent but incorporating certain specific revisions of such a system as more fully described and illustrated in the Calosi patent application No. 405,225, filed December 9, 1953.

Figure 2:
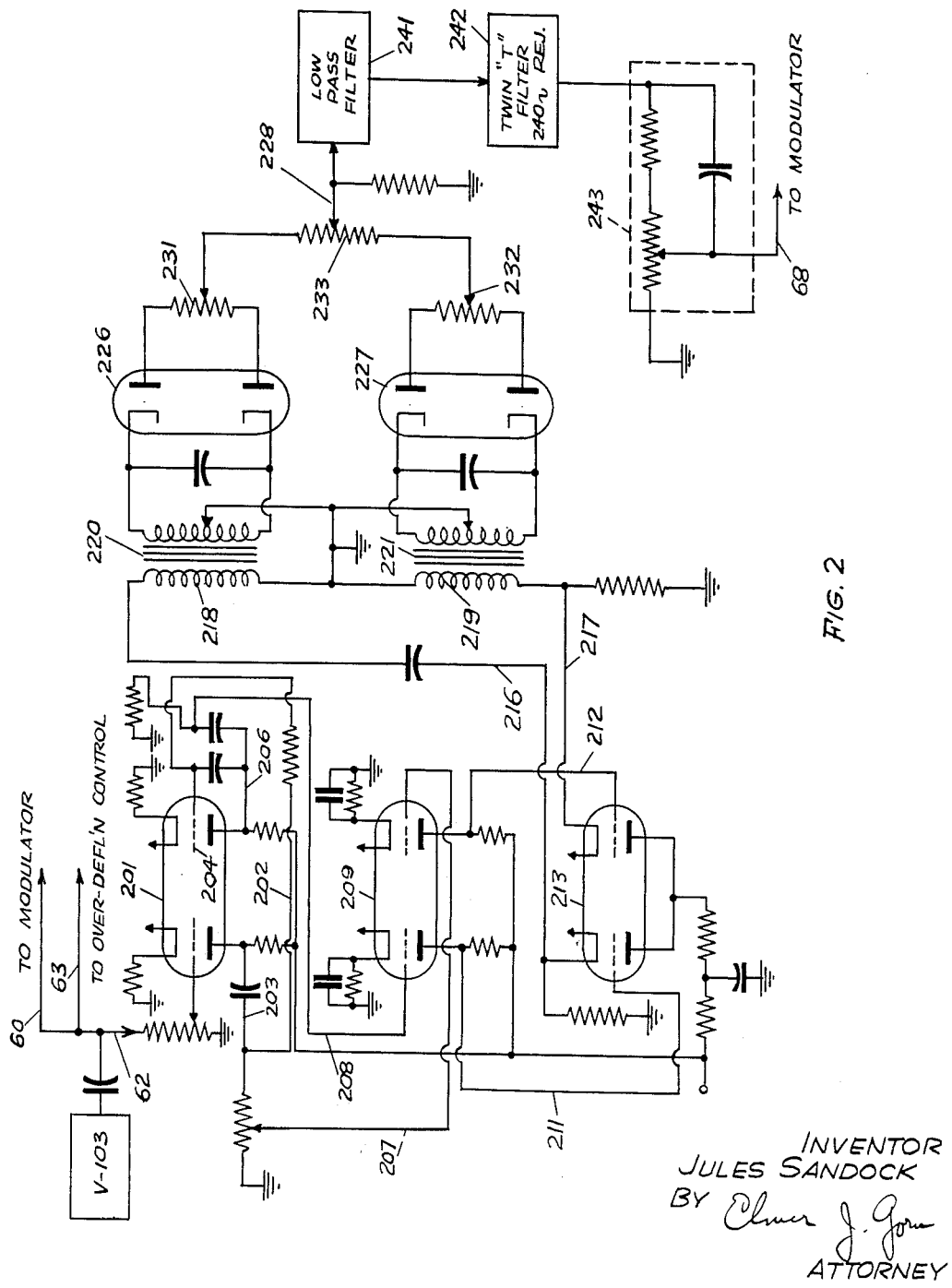

In the drawings:

Fig. 1 is a schematic diagram of a position and motion control system embodying the invention, with certain electrical components and circuit connections being omitted for greater clarity; and Fig. 2 shows the details of the deviation detection portion of the system of Fig. 1, including the phase-displacing, voltage dividing and four-phase rectifying elements above referred to.

In Fig. 1, the signal receiving terminals 17, 18, 23, and 24 are to be understood as corresponding to those similarly designated in Patent No. 2,627,055, and are adapted to receive operating voltages Vx and Vy, proportional to the orthogonally related abscissal and ordinal components, respectively, of the original duplicating force. As explained more fully in said patent, the said voltages may be those which are generated in quadrantally spaced field coils of a transducer whose armature is suitably connected to a stylus or equivalent index element having contact with a template whose contour is to be duplicated. Voltages Vx and Vy are alternating voltages of the same phase but represent physical forces that are ninety degrees divergent.

The voltage Vx is applied to an amplifier 51 and the voltage Vy to an amplifier 52. These units 51 and 52 are shown as corresponding to the similarly designated units of the cited patent, except that they are preceded by filter networks 49 and 50, respectively, involving inductance-capacitance configurations having a particular effectiveness in the system here disclosed in that they tend to eliminate, by attenuation, undesirable "ringing" and other unwanted transient frequency components induced by momentary shock excitations such as those set up by mechanical vibration or sudden extreme contour changes. These filter networks are disclosed more fully, and claimed per se, in United States application No. 396,238, filed December 4, 1953, in the name of A. J. Carr, Jr., said application being assigned to the assignee of the subject invention.

The output circuits 156 and 157 of amplifiers 51 and 52 are routed through phase shifting networks 158 and 159, including potentiometers R115 and R120, and capacitors C114 and C117. A pair of electron triodes in a common envelope V–103 have their control grids connected to the movable taps of potentiometers R115 and R120, respectively, the tube V–103 constituting part of the first of the two stages of voltage vector summation. By reason of these connections the grids of tube V–103 receive voltages that are, respectively, ninety electrical degrees out of phase, and converts these two voltage vectors into a resultant voltage proportional in magnitude to the vector sum. This resultant voltage is delivered to junction point TP104 (Fig. 1), from which point it follows along four diverging conductors 60, 61, 62, and 63. Conductor 60 leads to the modulator unit 66. Conductor 61 leads to the left-hand control grid of a twin triode V–109 constituting part of the second of the two stages of voltage vector summation; conductor 62 leads to the deviation detection circuits 64 shown in detail in Fig. 2; and conductor 63 leads to a unit 65 which operates to suspend the normal functioning of the system, and to substitute alternatively controls, when the stylus deflects to an excessive degree, that is, to a degree beyond that readily compensable by action of the single modulator unit 66. The unit 65 will preferably take the form disclosed in detail in United States application No. 396,237, filed December 4, 1953, in the name of A. J. Carr, Jr., and assigned to the assignee of the subject invention.

As heretofore noted, the signal deviation detection circuits 64 include a phase displacing circuit, voltage dividing circuits, four-phasse rectifying circuits, and filtering circuits. As shown in Fig. 2, they also include voltage amplifying circuits and a final "anti-hunt" stage for regulating the correction signal energy flow in proportion to the varying percentage of alternating voltage component that is superimposed upon the basic D. C. correction voltage; this percentage being a variable that is proportional to the variations in the stressing force applied to the stylus.

The phase displacing circuit is shown in Fig. 2 as incorporated in a twin triode tube 201 in such manner that the left-hand section of the tube acts as an amplifier while the right-hand section acts to produce ninety degree phase rotation, by reason of the bridging connection 202 from the output circuit 203 back to the grid 204. The plate outputs of lines 203 and 206 are deliverd to the respective grids of amplifier tube 209 by way of leads 207 and 208, respectively, and the plate outputs of tube 209 are delivered to the respective grids of tube 213 by way of leads 211 and 212, respectively.

The voltage dividing circuits are shown in Fig. 2 as cathode follower circuits 216 and 217 leading from tube 213 to the respective primary windings 218 and 219 of a pair of transformers 220 and 221 whose secondary windings are center-tapped to provide four phase-displaced outputs for individual rectification in the four parallel circuits constituted by the four rectifying paths established by the twin diodes 226 and 227. These four individually rectified outputs are then merged in the single line 228 by way of three adjustable potentiometers 231, 232, and 233, making it possible to achieve precise regulation of each rectifying stage. Filters 241 and 242, and the above-described "anti-hunt" network 243, complete the assembly of detection circuits illustrated in Fig. 2 and represented by the block 64 in Fig. 1. Conductor 68, bearing the detected correction signal energy, leads to the upper control grid of a dual control tube V–101 constituting one-half of the interconnected tube pair V–101, V–102 of the single modulator unit 66 which coacts with circuit rotator unit 71 and the second stage vector summation unit V–109 in establishing voltage signal consolidation in said unit V–109. The upper control grid of tube V–102 receives the pre-fixed D. C. reference voltage supplied by source 105, corresponding to the similarly designated D. C. reference source in the cited Calosi patent.

The plate circuits of tube V–101 and V–102 are connected to opposite terminals of the primary winding of transformer T101, whose secondary leads to the left-hand control grid of twin triode V–108 forming a part of the "Miller circuit" ninety-degree rotator 71, leading to the right-hand control grid of twin triode V–109, where it joins with the output of the first summation stage V–103 (delivered to tube V–109 by way of lead 61) to achieve the second stage of vector consolidation.

The output of vector consolidation unit 75 is supplied to line 76 leading to the phase-controlled signal dividing unit 77 consisting of R–C combinations including potentiometers R127 and R128, whose movable taps are connected electrically to the respective grids of twin triode amplifier V–114. The plate circuits 80 and 81 of amplifier V–114 excite the grids of amplifier tubes V–303 and V–304, respectively, in quadrature, and these tubes supply their respective motor command signal outputs to the saturation phase discriminator 85, by way of transformers 83 and 84, respectively.

As more fully disclosed in the Calosi application above identified, the phase discriminator, or demodulator 85, consists of two demodulating networks, each of which includes a pair of twin triodes 86, 87, whose control grids are excited by connecting them to the terminals of the secondary of transformers 83 and 84, respectively. The saturation of the four triode circuits in quadrantal sequence results from the fact that the grid signal is so large that the curent in the affected triode becomes sinusoidal to follow the plate supply reference voltage so that for every stage of each cycle one of the four triodes is conducting, the conducting triode for each successive quarter-cycle being the one whose grid and plate are simultaneously of positive potential. Thus out of the two demodulators 86 and 87 are derived two D. C. voltages, one orthogonally proportional to the other. Because of this complementary character of the two motor controlling voltages, the combined velocity of the motor drives M$x$ and M$y$ will always remain constant in magnitude. The direction of this combined velocity is, of course, determined by the vector consolidation, in unit 75, of all of the deviation compensating signals; hence the result of the combined action of the motors M$x$ and M$y$ will be to maintain the stylus in contact with the template's surface along a course that is tangential to said surface.

Since the two motor command voltages delivered by discriminator 85 are D. C. voltages, as above determined, it becomes possible to employ thyratron tubes as the control agencies for the two motors M$x$ and M$y$, and to excite the grids of these tubes with these varying D. C. voltages as amplified in D. C. amplifiers 91 and 191. The motor armature power supply may be A. C. current supplied by the transformer secondary windings 95, 96, 195, and 196, and rectified by the action of the thyratrons, so that only the D. C. component is utilized. Suitable voltage dividing and rectifying circuits, not shown, function to control the application of the necessary biasing voltage to the grids of the thyratrons 93, 94, 193, and 194 and hence govern the speed and direction of rotation of the armatures 98 and 198, respectively, of motors M$x$ and M$y$, in accordance with the strength of the control voltages.

Prior to reaching the grids of the thyratrons, the D. C. voltages are passed through filter networks 88 and 188, respectively, which networks reject 120 C. P. S. components of the ripple voltage increment which may accompany the basic D. C. signal voltage.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, means for utilizing a pair of complementary A. C. vector voltages copulatively representative of a stressing force, said utilizing means including a twin triode whose respective control grids receive said complementary A. C. vector voltages, and whose anodes cooperate to effect a summation of said vector voltages for transmission to a utilization circuit, and means for applying a voltage modifying signal to said utilization circuit, said last-named means comprising four-phase detection means interposed between said twin-triode and said utilization circuit and operative to convert the consolidated A. C. voltages into a D. C. voltage whose magnitude varies in proportion to variations in said stressing force.

2. In a control system, means for utilizing a pair of complementary A. C. vector voltages copulatively representative of a stressing force, said utilizing means including means for effecting a summation of said vector voltages for transmission to a succeeding stage of the system, and means for applying to said succeeding stage a D. C. voltage whose magnitude varies in proportion to variations in said stressing force, said last-named means comprising an amplifying and phase displacing twin triode whose first control grid receives the voltage output of said vector summation means, and whose second control grid effects ninety-degree phase rotation of the triode output, and means for rectifying the output of said twin triode, to derive a D. C. voltage to be compared with a reference D. C. voltage in a subsequent stage of the system where signal correction is accomplished.

3. In a control system, means for utilizing a pair of complementary A. C. vector voltages copulatively representative of a stressing force, said utilizing means including means for effecting a summation of said vector voltages for transmission to a succeeding stage of the system, and means for applying to said succeeding stage a D. C. voltage whose magnitude varies in proportion to variations in said stressing force, said last-named means comprising phase displacing means controlled by the voltage output of said vector summation means, and rectifying and filtering means receiving the phase-displaced output of said phase displacing means.

4. In a control system, means for utilizing a pair of complementary A. C. vector voltages copulatively representative of a stressing force, said utilizing means including means for effecting a summation of said vector voltages for transmission to a succeeding stage of the system, and means for applying to said succeeding stage a D. C. voltage whose magnitude varies in proportion to variations in said stressing force, said last-named means comprising phase displacing means controlled by the voltage output of said vector summation means, and rectifying and anti-hunt means receiving the phase-displaced output of said phase displacing means.

5. A control system as defined in claim 2 including cathode follower amplifying circuits interposed between said phase displacing means and said rectifying means, and means for dividing the output of said cathode follower circuits for four-phase rectification in said rectifying means.

No references cited.